US 9,964,053 B2

(12) United States Patent
Suzuki et al.

(10) Patent No.: US 9,964,053 B2
(45) Date of Patent: May 8, 2018

(54) COMBUSTION CONTROL DEVICE FOR GAS ENGINE

(71) Applicant: Mitsubishi Heavy Industries, Ltd., Tokyo (JP)

(72) Inventors: Hajime Suzuki, Tokyo (JP); Hideki Nishio, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 216 days.

(21) Appl. No.: 14/777,470

(22) PCT Filed: Feb. 20, 2014

(86) PCT No.: PCT/JP2014/054049
§ 371 (c)(1),
(2) Date: Sep. 15, 2015

(87) PCT Pub. No.: WO2014/148191
PCT Pub. Date: Sep. 25, 2014

(65) Prior Publication Data
US 2016/0032847 A1 Feb. 4, 2016

(30) Foreign Application Priority Data

Mar. 19, 2013 (JP) .................................. 2013-056776

(51) Int. Cl.
*F02M 7/00* (2006.01)
*F02D 35/02* (2006.01)
(Continued)

(52) U.S. Cl.
CPC ......... *F02D 35/027* (2013.01); *F02D 41/008* (2013.01); *F02D 41/0027* (2013.01);
(Continued)

(58) Field of Classification Search
CPC .. F02D 41/008; F02D 41/0085; F02D 41/126; F02D 41/1443; F02D 35/027; F02D 41/123; F02D 19/02; F02P 5/1522
(Continued)

(56) References Cited

U.S. PATENT DOCUMENTS 4,221,193 A * 9/1980 Ezoe .................... F02D 41/123
123/483
4,243,009 A * 1/1981 Staerzl .................. F02B 61/045
123/435
(Continued)

FOREIGN PATENT DOCUMENTS

JP H03185270 A 8/1991
JP H0579440 A 3/1993
(Continued)

OTHER PUBLICATIONS

Notification Concerning Submission, Obtention or Transmittal of Priority Document, App. No. PCT/JP2014/054049, Filed Feb. 20, 2014, dated Apr. 10, 2014, 1 Page.
(Continued)

*Primary Examiner* — Lindsay Low
*Assistant Examiner* — Josh Campbell
(74) *Attorney, Agent, or Firm* — Berkeley Law & Technology Group, LLP

(57) ABSTRACT

In an embodiment, a combustion control device for an engine includes: a knocking determination unit to determine occurrence of knocking of each of the cylinders; a knocking reduction unit to halt or reduce supply of gas to a cylinder in which the knocking is occurring and reduce supply of the gas to other cylinders in which the knocking is not occurring; a first recovery unit configured to recover a state where the gas is at least reduced in the cylinder in which the knocking is occurring; and a second recovery unit config-
(Continued)

ured to recover a state where the gas is reduced in other cylinders within which knocking is not occurring. In embodiments, a recovery time of the first recovery unit is shorter than a recovery time of the second recovery unit, and prioritizing recovery of the cylinder in which the knocking is occurring.

5 Claims, 5 Drawing Sheets

(51) Int. Cl.
*F02D 41/22* (2006.01)
*F02D 41/00* (2006.01)
*F02D 41/30* (2006.01)
*F02D 41/12* (2006.01)
*F02D 19/02* (2006.01)

(52) U.S. Cl.
CPC ......... *F02D 41/22* (2013.01); *F02D 41/3005* (2013.01); *F02D 19/021* (2013.01); *F02D 19/025* (2013.01); *F02D 35/023* (2013.01); *F02D 41/0087* (2013.01); *F02D 41/126* (2013.01); *Y02T 10/40* (2013.01)

(58) Field of Classification Search
USPC ................... 123/435, 406.2, 406.21, 406.29; 73/35.01, 35.03–35.06; 701/111
See application file for complete search history.

(56) References Cited

U.S. PATENT DOCUMENTS

| | | | | |
|---|---|---|---|---|
| 5,249,562 A | * | 10/1993 | Klenk | F02D 41/0087 123/481 |
| 6,505,603 B1 | * | 1/2003 | Schray | F02D 35/027 123/299 |
| 2003/0192513 A1 | * | 10/2003 | Nist | F02B 43/00 123/525 |
| 2004/0139943 A1 | * | 7/2004 | Kern | F01P 11/16 123/198 D |
| 2006/0137648 A1 | * | 6/2006 | Nakashima | F02D 35/027 123/299 |
| 2007/0062489 A1 | | 3/2007 | Miyata et al. | |
| 2007/0150165 A1 | * | 6/2007 | Saikkonen | F02D 35/027 701/104 |
| 2007/0157912 A1 | * | 7/2007 | Ritter | F02B 29/0418 123/679 |
| 2007/0215102 A1 | * | 9/2007 | Russell | F02D 35/027 123/310 |
| 2007/0215107 A1 | * | 9/2007 | Shelby | F02D 41/0087 123/406.26 |
| 2013/0139786 A1 | * | 6/2013 | Glugla | F02D 41/0087 123/321 |
| 2013/0255628 A1 | * | 10/2013 | Moren | F02B 69/04 123/406.29 |
| 2014/0048046 A1 | * | 2/2014 | Saeki | F02D 41/403 123/478 |

FOREIGN PATENT DOCUMENTS

| | | | |
|---|---|---|---|
| JP | H0828319 A | | 1/1996 |
| JP | 2006138324 A | | 6/2006 |
| JP | 4247842 B2 | | 1/2009 |
| JP | 2009281251 A | | 12/2009 |
| JP | 2010084739 A | | 4/2010 |
| JP | 2010112244 A | * | 5/2010 |
| JP | 4688916 B2 | | 2/2011 |
| WO | 2005088107 A1 | | 9/2005 |
| WO | 2012057691 A1 | | 5/2013 |
| WO | 2014148191 A1 | | 9/2014 |

OTHER PUBLICATIONS

Notification Concerning Transmittal of International Preliminary Report on Patentability, App. No. PCT/JP2014/054049, Filed Feb. 20, 2014, dated Oct. 1, 2015, 10 Pages.
International Search Report, App. No. PCT/JP2014/054049, Filed Feb. 20, 2014, dated Mar. 18, 2014, 11 Pages.
European Search Report, App. No. 14768042.5, dated Feb. 8, 2016, 8 Pages.
Decision to Grant a Patent, App. No. JP2013-056776, dated May 9, 2016, 6 Pages.

* cited by examiner

COMBUSTION CONTROL DEVICE FOR GAS ENGINE

TECHNICAL FIELD

This disclosure relates to a combustion control device for a gas engine and to a combustion control device with respect to knocking in particular.

BACKGROUND

Power generation facilities operated by a gas engine using natural gas or other type of gaseous fuel as a main fuel are launched to provide a source of cleaner-burning energy. To make a gas engine perform stable and efficient operation, fuel supply valves provided for respective cylinders are controlled, and the ignition timing is also controlled. However, abnormal combustion such as knocking and misfire may nonetheless occur. It may be useful to detect and avoid abnormal combustion such as knocking and misfire at an early stage.

To avoid knocking, supply of gas fuel is halted or reduced for a cylinder in which knocking has occurred, or the ignition timing is retarded in some cases. For instance, Patent Document 1 (JP4688916B) and Patent Document 2 (JP4247842B) are known.

Patent Document 1 discloses a load leveling control in which an exhaust temperature is detected for cylinders of a gas engine, a cylinder in which knocking or misfire has appeared is detected, an amount of fuel supply to a cylinder comprising a maximum exhaust temperature is reduced, and an amount of fuel supply to a cylinder comprising a minimum exhaust temperature may be increased. Further, supply of fuel may be halted or reduced for a predetermined period of time for the cylinder in which knocking or misfire has occurred. Furthermore, the load leveling control is performed excluding the cylinder for which a measure for addressing knocking or misfire is being taken.

Patent Document 2 discloses a knocking control device for a gas engine. The magnitude of knocking is detected by a knocking sensor, and the mean value of occurrence frequency in the cylinders is compared with the occurrence frequency in a certain cylinder on the basis of a measurement value of occurrence frequency of knocking that is a predetermined value or more. If the occurrence frequency in the certain cylinder is not less than a predetermined frequency as compared to the mean value of occurrence frequency, the amount of gas injection is reduced for the certain cylinder. If the occurrence frequency in the cylinder is not more than a predetermined frequency as compared to the mean value of occurrence frequency, the amount of gas injection is increased for the cylinder. Patent Document 2 similarly discloses retarding and advancing the injection timing of the pilot fuel injection timing and the ignition timing of the spark ignition timing.

SUMMARY

Particular embodiments provide a combustion control device for a gas engine, comprising: a knocking determination unit configured to determine occurrence of knocking of the cylinders of the gas engine; a knocking reduction unit configured to halt or reduce supply of gas fuel to a cylinder in which knocking has occurred and to reduce supply of the gas fuel to other cylinders in which the knocking has not occurred, if the occurrence of the knocking is to be determined by the knocking occurrence determination unit; a first recovery unit configured to recover a state in which the gas fuel is to be halted or reduced in the cylinder in which the knocking has occurred, if it is determined that the knocking has not occurred after the halt or reduction; and a second recovery unit configured to recover a state in which the gas fuel is reduced in the other cylinders which are not the cylinder in which the knocking has occurred. A recovery time of the first recovery unit is shorter than a recovery time of the second recovery unit, and recovery of the cylinder in which the knocking has occurred is performed as a priority.

BRIEF DESCRIPTION OF DRAWINGS

FIG. 4A illustrates an instance of a cylinder other than the cylinder in which knocking is occurring. FIG. 4B illustrates an instance of cylinder in which knocking is occurring according to an embodiment. FIG. 4C is a comparative example in accordance with an embodiment.

DETAILED DESCRIPTION

Figure 1:
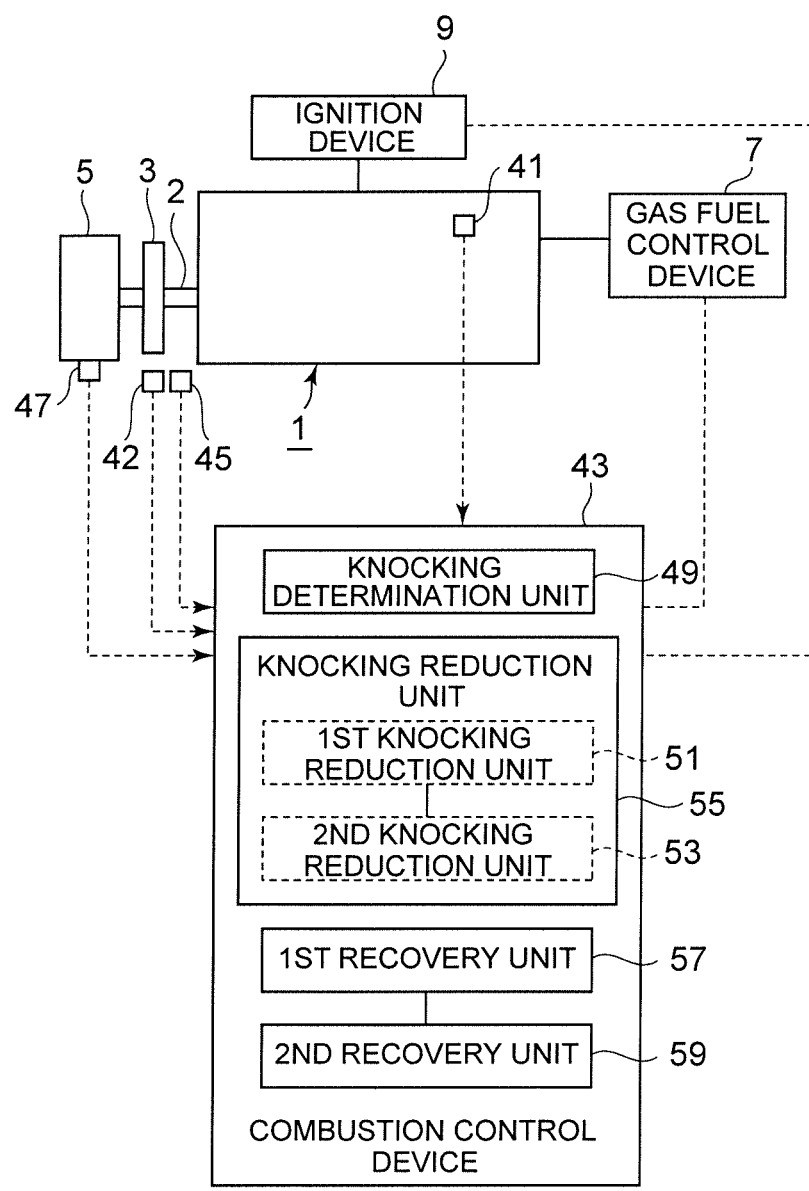
FIG. 1 is a system diagram of an overall configuration of a combustion control device of a gas engine according to an embodiment.

Embodiments may provide a combustion control device for a gas engine, including: a knocking determination unit configured to determine occurrence of knocking of the cylinders; a knocking reduction unit configured to halt or reduce supply of gas fuel to a cylinder in which the knocking is occurring and reduce supply of the gas fuel to other cylinders in which the knocking is not occurring, if the occurrence of the knocking is determined by the knocking occurrence determination unit; a first recovery unit configured to recover a state in which the gas fuel is halted or reduced in the cylinder in which the knocking is occurring, if it is determined that the knocking is not occurring after the halt or reduction; and a second recovery unit configured to recover a state in which the gas fuel is reduced in the other cylinders which are not the cylinder in which the knocking is occurring. A recovery time of the first recovery unit is shorter than a recovery time of the second recovery unit, and recovery of the cylinder in which the knocking is occurring is performed as a priority.

In an embodiment, if it is determined that knocking is occurring, supply of gas fuel to the cylinder in which knocking is occurring may be halted or reduced, and supply of gas fuel to cylinders, other than the cylinder in which knocking is occurring, is reduced. In this way, the air-fuel ratio with respect to the cylinder in which knocking is occurring shifts to the lean side, and thus occurrence of knocking is restricted. Further, also in the other cylinders in which the knocking is not occurring, the gas fuel is reduced in response to a predetermined command to reduce the load due to a decrease in the power generation output, which may thus reduce the occurrence of overload.

In embodiments, reduction or halt of the gas fuel restricts occurrence of knocking. At another time, if it is determined that knocking is not occurring by the knocking determination unit, the reduced or halted supply of gas fuel may be recovered and returned to the original condition, for example, the required amount of gas fuel corresponding to the required load.

In an embodiment, the first recovery unit may operate to recover the cylinder in which knocking is occurring from a state in which the gas fuel is halted or reduced, and the second recovery unit may operate to recover cylinders other than the cylinder in which knocking is occurring from a state in which the gas fuel is reduced. The recovery time of the first recovery unit is set to be shorter than the recovery time of the second recovery unit, so that recovery of the cylinder in which knocking is occurring is performed in priority. Thus, recovery is first performed for the cylinder in which knocking is occurring, and then if abnormality is not occurring again, for example, after confirming that abnormal combustion such as knocking and misfire is not occurring again, recovery can be completed for other cylinders in which knocking is not occurring. In this way, it may be possible to perform the recovery control securely and stably.

Further, in an embodiment, the first recovery unit and the second recovery unit may be configured to start a recovery control if the knocking is not occurring within a predetermined period after the halt or reduction of the gas fuel by the knocking reduction unit.

As described above, with the predetermined standby period set after reduction or halt of the gas fuel by the knocking reduction unit, it is possible to determine whether the knocking is occurring again during the period, which makes it possible to perform the recovery control securely and stably.

Further, in an embodiment, an increase rate of the gas fuel of the first recovery unit may be set to be greater than an increase rate of the gas fuel of the second recovery unit.

As described above, with an increased rate of the gas fuel of the first recovery unit to be greater than the increase rate of the gas fuel of the second recovery unit, it is possible to shorten the recovery time of the first recovery unit as compared to that of the second recovery unit.

Further, the first recovery unit may be set to perform the recovery control to recover, after a short period of time, for example, two to three seconds after the start. Although it is possible to address the knocking effectively by reducing the gas fuel, a decrease in the combustion temperature in return reduces the temperature inside the combustion chamber, which may lead to a misfire due to unstable combustion that emerges if an amount of gas fuel is gradually increased upon recovery. Thus, it is possible to avoid such unstable recovery by increasing the amount of gas fuel at once.

Further, in an embodiment, an amount of reduction of the gas fuel reduced by the knocking reduction unit may be set to be larger for the cylinder in which the knocking is occurring than for the other cylinders in which the knocking is not occurring.

For the cylinder in which knocking is occurring, the amount of gas fuel reduction is an amount for shifting the air-fuel ratio to the lean side to restrict knocking. For other cylinders in which knocking is not occurring, assuming that there is one cylinder with knocking, the amount of reduction is an amount accompanying the load reduction of the power generation output for preventing overload based, at least in part, on an increase in the load applied to the other cylinder, the increase corresponding to the amount of the one cylinder with knocking. In this way, the amount of gas-fuel reduction is set to be larger for the cylinder in which the knocking is occurring than for the other cylinders in which the knocking is not occurring, which makes it possible to perform the control to reduce knocking effectively.

Further, in embodiments, if the knocking occurs again during the predetermined period, the gas fuel may be reduced further by an amount of gas-fuel reduction which is set by the knocking reduction unit at a time if the knocking occurs again.

As described above, if knocking has occurred again during the standby period, it is possible to perform reduction of knocking and the subsequent recovery control stably by reducing the amount of gas fuel supply even further at this point of time.

According to embodiments, as a countermeasure to knocking in a gas engine, it is possible to prevent the gas engine from entering an unstable combustion state, such as misfire, upon recovery by halting or reducing the gas fuel for the cylinder in which knocking is occurring and then increasing the amount of gas fuel again to appropriately perform recovery control upon recovery to improve performance.

In particular embodiments, the first recovery unit may recover the cylinder in which knocking is occurring from a state in which the gas fuel is halted or reduced, and the second recovery unit recovers cylinders other than the cylinder in which knocking is occurring from a state in which the gas fuel is reduced. If an amount of gas fuel is increased to perform recovery, the recovery time of the first recovery unit is set to be shorter than the recovery time of the second recovery unit, which makes it possible to complete recovery of the cylinder in which knocking is occurring in priority, and to complete recovery of other cylinders with no knocking after it is checked whether knocking is occurring again. In this way, it is possible to perform the recovery control securely and stably.

Particular embodiments will now be described in detail with reference to the accompanying drawings. It is intended, however, that unless particularly specified, dimensions, materials, shapes, relative positions and the like of components described in the embodiments shall be interpreted as illustrative only and not limitative of the scope of claimed subject matter.

Figure 2:
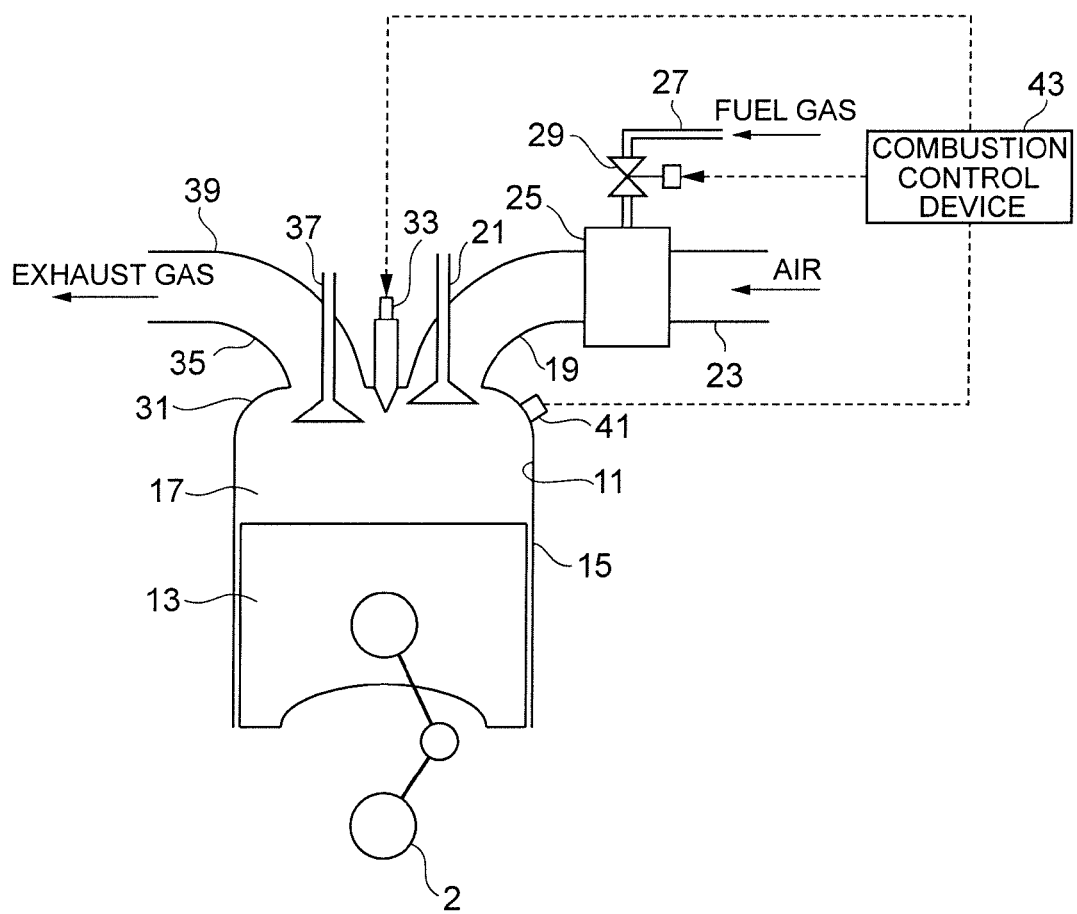
FIG. 2 is a partial cross-sectional explanatory diagram of a peripheral configuration of a combustion chamber of the gas engine illustrated in FIG. 1 according to an embodiment.

Thus, FIG. 1 is a diagram of an overall configuration of a combustion control device of a gas engine according to an embodiment. FIG. 2 is a partial cross-sectional explanatory diagram of a peripheral configuration of a combustion chamber.

In FIG. 1, the gas engine (hereinafter, merely referred to as "engine") 1 comprises a multi-cylinder four cycle engine, for example, in which gas fuel such as natural gas and or other gaseous fuel is used as main fuel. A flywheel 3 is mounted to a crankshaft 2 of the engine 1, and a generator 5 is directly mounted to the flywheel 3. Further, a gas-fuel control device 7 for controlling an amount of gas fuel which is to be supplied into the cylinders of the engine 1, and an ignition device 9 for igniting gas fuel supplied into the cylinders, are provided.

As illustrated in FIG. 2, the engine 1 includes a piston 13 reciprocably fitted in a cylinder 11, a main combustion chamber 17 defined and formed between an upper surface of the piston 13 and an inner surface of the cylinder block 15, an intake port 19 connected to the main combustion chamber 17, and an intake valve 21 for opening and closing the intake port 19.

Further, a gas mixer 25 is disposed in a supply-air pipe 23 at the upstream side of the intake port 19, and a gas supply pipe 27 is connected to the supply-air pipe 23 at the upstream side of the intake port 19. Fuel gas supplied through a gas adjustment valve 29 disposed in the gas supply pipe 27 to adjust the amount of fuel gas and air supplied through the supply-air pipe 23 are premixed in the gas mixer 25.

Premixed gas may pass through the intake port 19 to arrive at the intake valve 21, and the intake valve 21 opens, so that the premixed gas may be supplied to the main combustion chamber 17. Here, the supply-air pipe 23, the gas supply pipe 27, the gas adjustment valve 29 disposed in the gas supply pipe 27, and the gas mixer 25 are provided for the cylinders.

Further, an ignition device 9 corresponding to each cylinder is provided for a cylinder head 31 which forms an upper portion of the main combustion chamber 17 of the corresponding cylinder. The ignition device 9 comprises a precombustion chamber (auxiliary chamber) and a spark plug, which are not illustrated. Fuel gas supplied into the precombustion chamber is ignited by the spark plug, so that flame produced in the precombustion chamber is injected into the main combustion chamber 17 so as to combust the mixed air in the main combustion chamber 17.

The ignition device 9 may be configured to be ignited by a spark plug at an appropriate timing on the basis of signals from an engine speed sensor 42, a crank-angle sensor 45, and a load sensor 47, and to inject flame into the main combustion chamber 17.

Further, an exhaust port 35 is connected to the main combustion chamber 17, so that exhaust gas after combustion may be discharged from the main combustion chamber 17 if the exhaust valve 37 opens. Further, an exhaust pipe 39 (not illustrated) may be connected to the downstream side of the exhaust port 35, and an exhaust supercharger (not illustrated) may be mounted to the exhaust pipe 39.

Further, a combustion pressure sensor 41 for detecting an in-cylinder pressure in the main combustion chamber 17 may be disposed on the cylinders. The engine speed sensor 42 for detecting the engine rotation speed and the crank-angle sensor 45 may be disposed on the flywheel 3. The load sensor 47 for detecting the load of the generator 5, which is the engine load, is may be disposed on the generator 5. The signals from the respective sensors are inputted into the combustion control device 43 described below.

Next, the combustion control device 43 in the engine 1 comprising the above-described configuration will be described. As illustrated in FIG. 1, the combustion control device 43 comprises a knocking determination unit 49 for determining whether an abnormal combustion state, especially knocking, is occurring in the combustion condition due to a change in the in-cylinder pressure in the main combustion chamber 17 of the cylinders mainly on the basis of a signal from the combustion pressure sensor 41.

Further, the combustion control device 43 comprises a knocking reduction unit 55, which comprises the first knocking reduction unit 51 and the second knocking reduction unit 53. The first reduction unit 52 halts or reduces supply of gas fuel to the cylinder in which knocking is occurring and the second knocking reduction unit 53 reduces supply of gas fuel to cylinders other than the cylinder in which knocking is occurring, if it is determined that knocking is occurring by the knocking determination unit 49.

The first knocking reduction unit 51 halts or reduces gas fuel for a cylinder in which knocking is occurring. Specifically, the gas fuel may be halted or reduced by controlling the opening degree of the gas adjustment valve 29 disposed in the gas supply pipe 27.

For instance, if it is determined that knocking is occurring, a reduction rate may be set so that the amount of supply is reduced by 2 to 3% from the amount of supply at the time. Further, supply of the gas fuel may be halted responsive to the reduction control becomes complex. The above amount of 2 to 3% reduction is the amount of gas fuel reduction which is required to shift the air-fuel ratio to the lean side to restrict knocking.

Further, the second knocking reduction unit 53 may reduce the gas fuel for cylinders other than the cylinder in which knocking is occurring. In this case, since knocking is not occurring in the cylinders, the load of power generation output is reduced to prevent the load applied to the other cylinders from increasing to give rise to overload (due to an increase in the load applied to the other cylinders based, at least in part, on operation of a governor mechanism) by the amount corresponding to one cylinder given that there is one cylinder in which knocking is occurring, instead of reduction of gas fuel for shifting the air-fuel ratio to the lean side.

For instance, assuming a case in which supply of gas fuel is halted for one cylinder among 18 cylinders due to knocking during operation at approximately 50% load, the load is reduced by 2 to 3% KW of the power generation output and set as an amount of reduction of gas fuel corresponding to the load reduction. As described above, the gas fuel is reduced by different amounts between a cylinder in which knocking is occurring and cylinders other than the cylinder in which knocking is occurring, which makes it possible to achieve an effect to restrict knocking with high efficiency.

Further, the combustion control device 43 includes the first recovery unit 57 and the second recovery unit 59. The first recovery unit 57 recovers to the amount of fuel gas before occurrence of knocking from a state in which the gas fuel is halted or reduced in the cylinder in which knocking is occurring, and the second recovery unit 59 recovers to the amount of gas fuel before reduction of torque from a state in which gas fuel is reduced in cylinders other than the cylinder in which knocking is occurring, if it is determined that there is no recurrence, i.e., if it is determined that knocking is not occurring during a predetermined standby period in a state in which the gas fuel is halted or reduced by the first and second knocking reduction units 51, 53.

The combustion control device 43 may be configured such that the recovery time of the first recovery unit 57 may be set to be shorter than the recovery time of the second recovery unit 59, so that recovery of the cylinder in which knocking is occurring is performed in priority to other cylinders in which knocking is not occurring.

As described above, recovery may be first performed for the cylinder in which knocking is occurring, and then if abnormality is not occurring again, i.e., after or while confirming that abnormal combustion such as knocking and misfire is not occurring again, recovery is completed for other cylinders in which knocking is not occurring. In this way, it may be possible to perform the recovery control securely and stably.

Further, reduction and recovery of gas fuel may be performed by the first knocking reduction unit 51, the second knocking reduction unit 53, the first recovery unit 57 and the second recovery unit 59 of the combustion control device 43 by controlling the opening degree of the gas adjustment valve 29 constituting the gas fuel control device 7.

Figure 3:
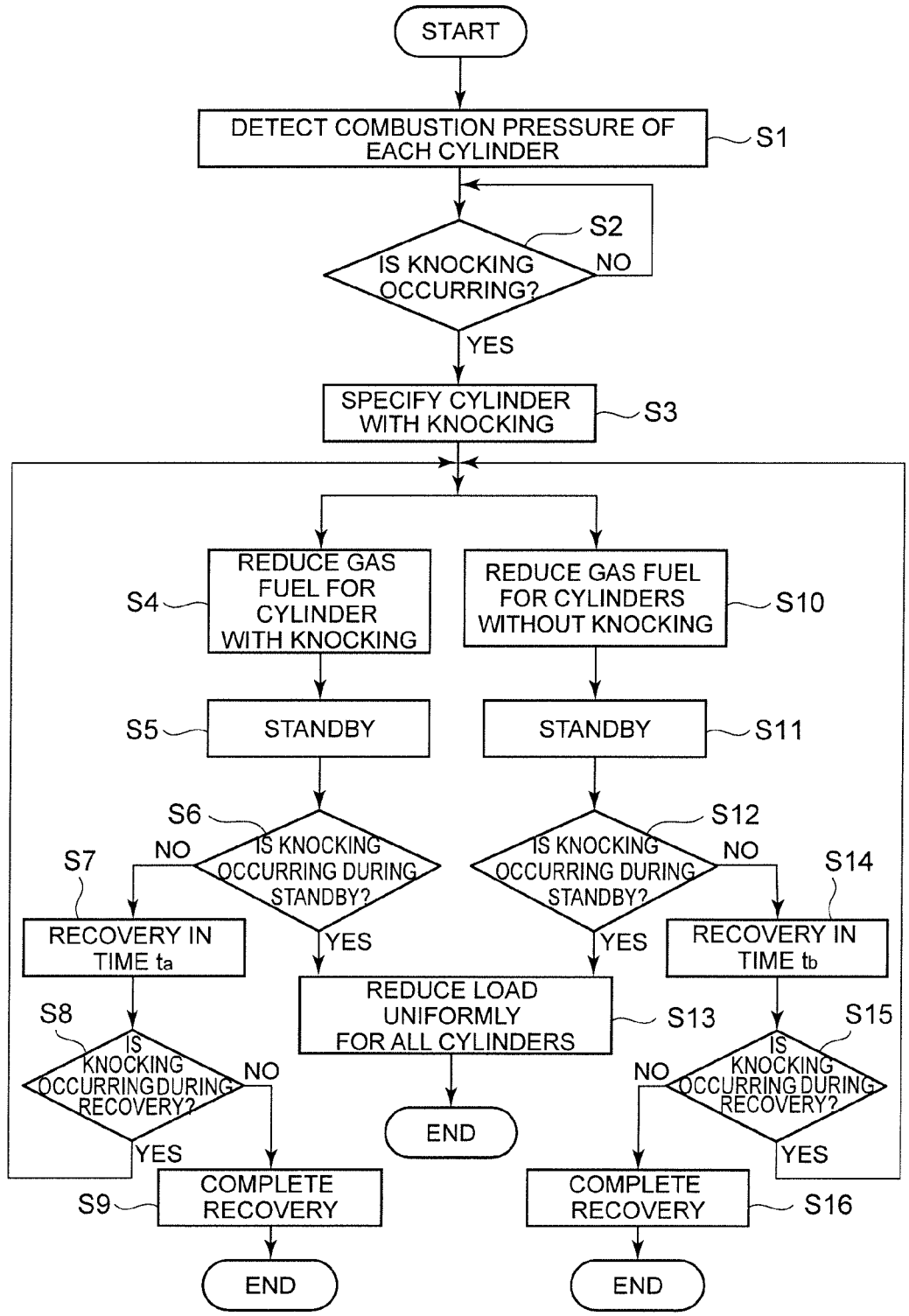
FIG. 3 is a flowchart of a combustion control device according to an embodiment.

Next, with reference to the flowchart of FIG. 3, the control flow of the combustion control device 43 will be described. First, if operation is started, an in-cylinder pressure of the cylinders is detected in block S1. In block S2, knocking is determined and determination of occurrence of knocking is repeated until knocking occurs. If knocking is occurring, the cylinder with knocking is specified in block S3.

Figure 4A:
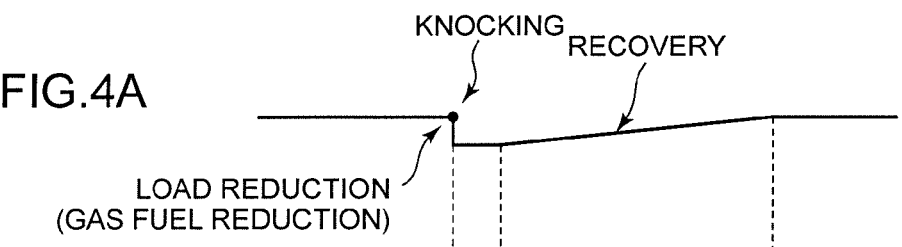
FIGS. 4A to 4C are charts of recovery states of gas fuel recovered by a recovery unit according to an embodiment.
Figure 4B:
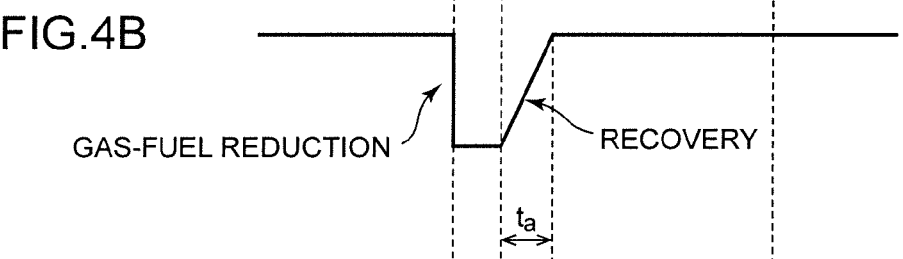

Next, in block S4, the amount of gas fuel is reduced or halted for the cylinder in which knocking is occurring, and the air-fuel ratio is shifted to the lean side (t0 in the time chart of FIG. 4B). Subsequently, in block S5, a standby state is continued for a predetermined time in a condition in which the amount of gas is reduced or halted (t0 to t1 in the time chart of FIG. 4B).

Next, in block S6, it is determined whether knocking has occurred during the standby state. If it is determined that knocking is not occurring in block S6, recovery is performed in time to (0 to t2 in the time chart of FIG. 4B) in block S7. In the next block S8, it is determined whether knocking is occurring during the recovery operation. If knocking is not occurring in block S8, the recovery is completed and the process is terminated in block S9. Further, if it is determined that knocking is occurring in block S8, the process returns to block S4 to be repeated.

On the other hand, after the cylinder in which knocking is occurring is determined in block S3, the amount of gas fuel is reduced in block S10 for other cylinders in which knocking is not occurring (t0 in the time chart of FIG. 4A). Reduction of the amount of gas fuel is set as the amount of gas fuel reduction which corresponds to the load reduction of 2 to 3% KW in the power generation output for preventing overload. Then, in block S11, a standby state is continued for a predetermined period of time in a condition in which the amount of gas is reduced (t0 to t1 in the time chart of FIG. 4A).

Next, in block S12, it is determined whether knocking has occurred during the standby state. If it is determined that knocking is not occurring in block S12, recovery is performed taking time tb (0 to t3 in the time chart of FIG. 4A) in block S14. In the next block S15, it is determined whether knocking is occurring during the recovery operation. If knocking is not occurring in block S15, recovery is completed and the process is terminated in block S16. On the other hand, if it is determined that knocking is occurring in block S15, the process returns to block S10 to be repeated. The above blocks S10 to S16 have the same process flow as the blocks S4 to S9.

Further, in block S6 and S12, if knocking occurs during the standby state, the process proceeds to block S13, in which uniform load reduction is performed for all cylinders and the amount of gas fuel is reduced accordingly.

Figure 4C:
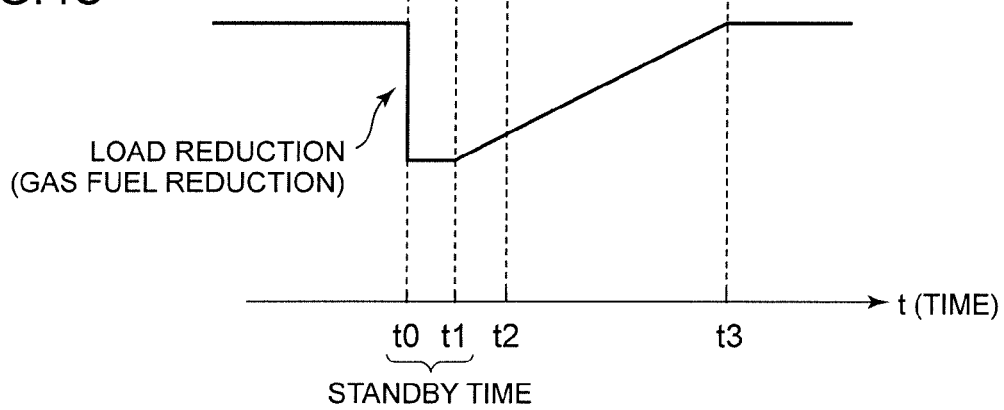

Recoveries performed by the first recovery unit 57 and the second recovery unit 59 are illustrated in FIG. 4. FIG. 4A is a case of a cylinder other than the cylinder in which knocking is occurring, in which recovery is performed by the second recovery unit 59. FIG. 4B is a case of the cylinder in which knocking is occurring, in which recovery is performed by the first recovery unit 57. FIG. 4C is a comparative example, in which the amount of supply of the gas fuel is reduced for all of the cylinders along constant load reduction.

In the comparative example of FIG. 4C, as illustrated in the drawing, uniform load reduction is performed for all of the cylinders, and then, after elapse of the standby time, recovery is performed taking the recovery time tb (at least in some embodiments, longer than the recovery time ta). Thus, the gas fuel is gradually increased in amount upon recovery from a state in which the temperature in the combustion chamber is low, which makes combustion unstable, and makes misfire likely to occur. It is possible to avoid such unstable recovery by increasing the amount of gas fuel at once in the recovery time ta (which is shorter than the recovery time tb) as in the present embodiment.

Further, while the first recovery unit 57 and the second recovery unit 59 start recovery simultaneously with time t1 as illustrated in FIGS. 4A and 4B, the second recovery unit 59 illustrated in FIG. 4A may start recovery at time t2, if recovery by the first recovery unit 57 is completed. As described above, with the second recovery unit 59 starting recovery at time t2, if recovery by the first recovery unit 57 is completed, it is possible to confirm that there is no recurrence of knocking or misfire during recovery in the cylinder in which knocking is occurring, and to perform a recovery control stably and securely by recovering cylinders other than the cylinders in which knocking is occurring after the confirming.

Figure 5:
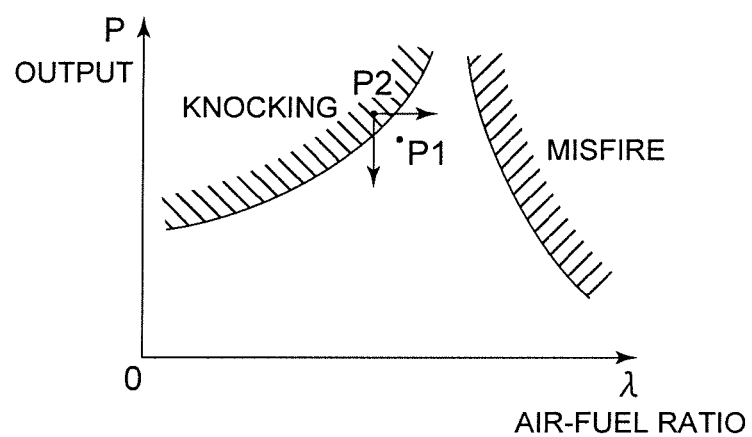
FIG. 5 is a chart for explaining a knocking area and a misfire area, the horizontal axis being an air-fuel ratio λ and the vertical axis being an engine output P in accordance with an embodiment.

FIG. 5 is a chart of a region in which abnormal combustion (e.g. knocking or misfire) of the engine 1 occurs. The horizontal axis is an air-fuel ratio λ and the vertical axis is an engine output P. The engine 1 of the present embodiment performs high-output operation, and is operated at substantially constant rotation at point P1. The operation point is likely to shift to the operation point P2 in the knocking area due to a change in the power generation load or in the environmental conditions. If the operation point has moved to the knocking area, it may be useful to reduce the output or shift the air-fuel ratio to the lean side to return the operation point to the normal operation area from the knocking area. In the present embodiment, knocking is avoided by reducing the amount of gas fuel at the operation point by 2 to 3% for the cylinder in which knocking is occurring and by shifting the air-fuel ratio to the lean side.

According to the above embodiment, gas fuel is halted or reduced for the cylinder in which knocking is occurring as a countermeasure to knocking in the engine 1, and then the gas fuel is appropriately increased in the subsequent recovery control to the optimum operation, which makes it possible to prevent the engine 1 from entering an unstable combustion state such as misfire upon recovery.

Specifically, the first recovery unit 57 recovers the cylinder in which knocking is occurring from a state in which the gas fuel is halted or reduced, and the second recovery unit 59 recovers cylinders other than the cylinder in which knocking is occurring from a state in which the gas fuel is reduced. Upon this recovery, the recovery time of the first recovery unit 57 is set to be shorter than the recovery time of the second recovery unit 59 so as to recover the cylinder in which knocking is occurring as a priority, and then completes recovery of other cylinders with no knocking. Thus, it is possible to perform the recovery control securely and stably.

According to embodiments, it is possible to prevent a gas engine from entering an unstable combustion state such as misfire by halting or reducing gas fuel for a cylinder in which knocking is occurring as a countermeasure to knocking in the gas engine and then increasing the amount of gas fuel again to appropriately perform recovery control upon recover to the optimum operation. Thus, embodiments may be suitably applied to a combustion control device of a gas engine for a generator.

The invention claimed is:

1. A combustion control device for a gas engine, comprising:
   a knocking determination unit configured to determine occurrence of knocking of cylinders of the gas engine;
   a knocking reduction unit configured to halt or reduce supply of gas fuel to a cylinder in which the knocking is occurring and reduce supply of the gas fuel to other cylinders in which the knocking is not occurring, if the occurrence of the knocking is determined by the knocking occurrence determination unit;

a first recovery unit configured to recover a state in the cylinder in which the gas fuel has been halted or reduced in which the knocking has occurred, to a state that precedes the halt or the reduction of the supply of gas fuel to the cylinder in which the knocking has occurred, if it is determined that the knocking has not occurred after the halt or reduction; and a second recovery unit configured to recover a state in the other cylinders in which the gas fuel has been reduced which are not the cylinder in which the knocking has occurred, to a state that precedes the halt or reduction of the supply of gas fuel to the cylinder in which the knocking has occurred, wherein a recovery time of the first recovery unit is shorter than a recovery time of the second recovery unit, and recovery of the cylinder in which the knocking is occurring is performed as a priority.

2. The combustion control device for a gas engine according to claim 1, wherein the first recovery unit and the second recovery unit are configured to start a recovery control if the knocking has not occurred within a predetermined period after the halt or reduction of the gas fuel by the knocking reduction unit.

3. The combustion control device for a gas engine according to claim 1, wherein an increase rate of the gas fuel of the first recovery unit is to be set to be greater than an increase rate of the gas fuel of the second recovery unit.

4. The combustion control device for a gas engine according claim 1, wherein an amount of reduction of the gas fuel reduced by the knocking reduction unit is set to be larger for the cylinder in which the knocking has occurred than for the other cylinders in which the knocking has not occurred.

5. The combustion control device for a gas engine according to claim 2, wherein, if the knocking occurs again in the predetermined period, the gas fuel is reduced further by an amount of reduction of the gas fuel which is set by the knocking reduction unit at a time if the knocking occurs again.

* * * * *